(No Model.)

C. & E. E. ERVIN.
TRACTION ENGINE.

No. 314,924. Patented Mar. 31, 1885.

WITNESSES
Chas. H. Davis.
Edwin L. Jewell

INVENTORS
Chas. & Edward E. Ervin.
By C. M. Alexander
Attorney

UNITED STATES PATENT OFFICE.

CHARLES ERVIN AND EDWARD E. ERVIN, OF PRINCETON, INDIANA.

TRACTION-ENGINE.

SPECIFICATION forming part of Letters Patent No. 314,924, dated March 31, 1885.

Application filed February 5, 1885. (No model.)

*To all whom it may concern:*

Be it known that we, CHARLES ERVIN and EDWARD E. ERVIN, citizens of the United States, residing at Princeton, in the county of Gibson and State of Indiana, have invented certain new and useful Improvements in Traction-Engines, of which the following is a specification, reference being had therein to the accompanying drawings.

This invention relates to a mode of guiding traction-engines, and the object is accomplished through and by means of a small cylinder connecting with the boiler, a toothed piston-rod connecting with a gear-wheel upon a suitable shaft, and chains or cords passing from said shaft to the axle of the forward wheels of the engine, as will be hereinafter more particularly set forth.

Figure 1:
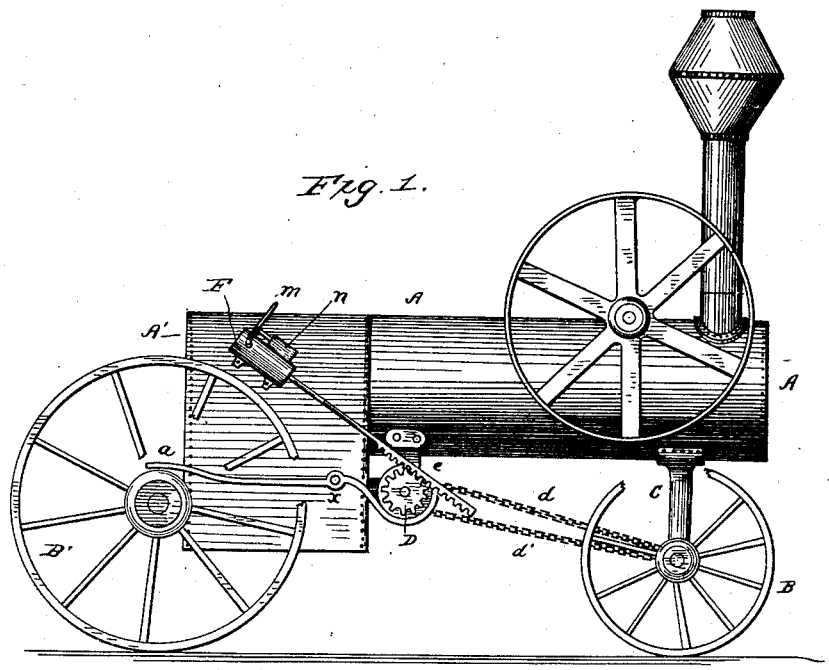
Figure 2:
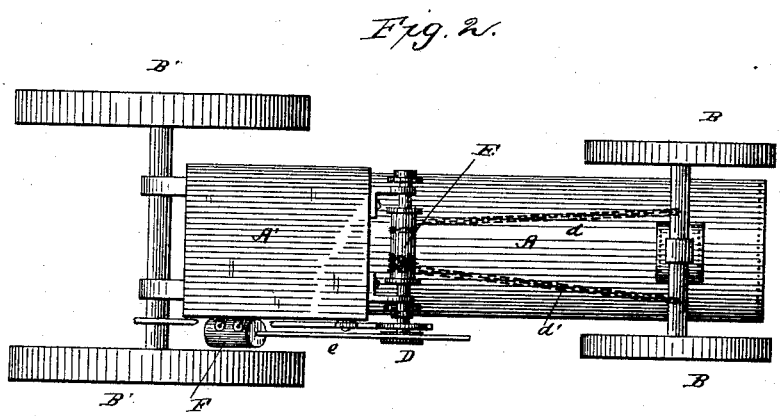

In the accompanying drawings, making a part of this specification, Figure 1 represents a side elevation, and Fig. 2 a bottom view, of our invention.

In the figures, A represents the boiler of an ordinary traction-engine, and A' the firebox, into which the boiler partially extends. Connected to the boiler, near its rear end, is a steam-cylinder, F, provided with an ordinary steam-chest, *n*, and cut-off. *m* represents a lever, which connects with the cut-off valves, and which is intended to be operated by the engineer for reversing, as may become necessary.

*c* represents the piston-rod constructed with the usual head, but extending out from the cylinder a suitable distance, and provided on its under side, toward its outer end, with gearing-teeth.

E represents a cylinder, which has its bearings in pendants from the boiler, and which is provided at one end with a gear-wheel, D, into which the teeth upon the piston-rod mesh for the purpose of rotating said cylinder backward or forward at the will of the engineer or operator.

Secured to the cylinder E are two chains, *d d'*, which are unequally wound. The other ends of these are secured to the axle of the front wheels, B B, which support and carry the forward end of the boiler. This axle has its bearings in the lower end of a pendant, C, which is secured to the under side of the boiler, near its forward end, the connection being such as to allow the axle to swivel or turn for giving direction of the engine. The chains being connected near the outer end of the axle, and one arranged to wind upon it while the other is unwinding, it will be readily perceived that by reversing the piston in the steam-cylinder the axle of wheels B B will swivel in such manner as to give such direction to the engine as may be required. It will be perceived that the forward axle may be turned while the engine is at rest, and thus direction given to it from the moment it starts, and also that its direction can be instantly changed while in motion.

To prevent the shaft E from turning and thus changing the direction of the engine when not desired, we use a brake, *a*. This brake is pivoted, as seen at *x*, and has its forward end curved so as to embrace the shaft E. The rear end of the lever is intended to protrude through the platform upon which the engineer stands, so that he can readily control it with his foot.

Having thus fully described our invention, what we claim as new, and desire to secure by Letters Patent, is—

A steam-cylinder connected to the boiler of a traction-engine near its forward end, and provided with a hand-lever for operating its cut-off valves, a piston-rod with gear-teeth, a gear-wheel upon the end of a rotating cylinder, E, into which the teeth of the piston-rod mesh, and chains *d d'*, which connect said cylinder to the shaft of the forward carrying-wheels of the engine, all for giving direction to the engine, substantially as set forth.

In testimony whereof we affix our signatures in presence of two witnesses.

CHAS. ERVIN.
EDWARD E. ERVIN.

Witnesses:
E. E. WILKINSON,
CHAS. H. WRIGHT.